(12) United States Patent
Kim et al.

(10) Patent No.: US 8,517,564 B2
(45) Date of Patent: Aug. 27, 2013

(54) LIGHT SOURCE ASSEMBLY AND TOUCH SCREEN DEVICE HAVING THE SAME

(75) Inventors: Joong-Hyun Kim, Cheonan-si (KR); Ju-Hwa Ha, Asan-si (KR); Kang-Woo Lee, Suwon-si (KR)

(73) Assignee: Samsung Display Co., Ltd. (KR)

( * ) Notice: Subject to any disclaimer, the term of this patent is extended or adjusted under 35 U.S.C. 154(b) by 246 days.

(21) Appl. No.: 13/089,461

(22) Filed: Apr. 19, 2011

(65) Prior Publication Data
US 2012/0099304 A1    Apr. 26, 2012

(30) Foreign Application Priority Data
Oct. 22, 2010  (KR) ................. 10-2010-0103389

(51) Int. Cl.
*F21V 7/00*  (2006.01)
*F21V 7/04*  (2006.01)

(52) U.S. Cl.
USPC ........... 362/231; 362/235; 362/612; 362/613; 362/631

(58) Field of Classification Search
USPC ................. 362/612, 613, 631, 627, 231
See application file for complete search history.

(56) References Cited

U.S. PATENT DOCUMENTS

| | | | |
|---|---|---|---|
| 8,294,849 B2* | 10/2012 | Toko | 349/72 |
| 8,339,373 B2* | 12/2012 | Chang | 345/173 |
| 2006/0124833 A1* | 6/2006 | Toda | 250/214 R |
| 2008/0074401 A1* | 3/2008 | Chung et al. | 345/175 |
| 2009/0027358 A1* | 1/2009 | hosono | 345/175 |
| 2009/0135625 A1* | 5/2009 | Yang et al. | 362/613 |
| 2009/0231511 A1* | 9/2009 | Takahashi et al. | 349/61 |
| 2011/0141150 A1* | 6/2011 | Hajjar et al. | 345/690 |

FOREIGN PATENT DOCUMENTS

| | | |
|---|---|---|
| JP | 2003262850 A | 9/2003 |
| JP | 2006-0079589 A | 3/2006 |
| JP | 2009-0032005 A | 2/2009 |
| KR | 10-2008-0028270 A | 3/2008 |

* cited by examiner

*Primary Examiner* — Sikha Roy
(74) *Attorney, Agent, or Firm* — Cantor Colburn LLP (57) ABSTRACT

A light source assembly includes first light sources emitting first light in a first wavelength range, second light sources emitting second light in a second wavelength range which is at least partially different from the first wavelength range, and an optical member on which light emitted from the first light sources and the second light sources is incident. A distance between adjacent first light sources, and a distance between adjacent second light sources is defined as an average pitch. The average pitch of the second light sources arranged in a specific direction, is larger than the average pitch of the first light sources arranged in the specific direction. The optical member has a reflectance with respect to the second light, which is larger than a reflectance with respect to the first light.

19 Claims, 10 Drawing Sheets

LIGHT SOURCE ASSEMBLY AND TOUCH SCREEN DEVICE HAVING THE SAME

This application claims priority to Korean Patent Application No. 10-2010-0103389 filed on Oct. 22, 2010, and all the benefits accruing there from under 35 U.S.C. 119, the contents of which in its entirety are herein incorporated by reference.

BACKGROUND OF THE INVENTION

1. Field of the Invention

The present invention relates to a light source assembly and a touch screen device having the same.

2. Description of the Related Art

In the recent information-oriented society, a display device is required to have a large size and a thin profile. Since a conventional cathode ray tube ("CRT") device does not satisfactorily meet such requirements, there is an explosive demand for a flat panel display device such as a plasma display panel ("PDP") device, a plasma address liquid crystal ("PALC") display panel, a liquid crystal display ("LCD") device, and an organic light emitting diode ("OLED") device.

A display device is being developed to include not only a function of displaying an image, but also a detection function of receiving external information. As an example of such a display device, there is a touch screen device.

The touch screen device is the most advanced input device replacing a keyboard or mouse. In the touch screen device, a touch screen is attached to a display panel, and a desired operation is performed by touching the display panel with an object, such as a user's finger. Accordingly, the touch screen device is an ideal device allowing an intuitive control in the graphic user interface ("GUI") environment (e.g., a window operating system), which can be widely applied to a computer-based training and simulation field, an office automation field, an education field, a game field and the like.

However, the touch screen display device employs a method of detecting a pressure applied to the surface of the touch panel, which requires a mechanical operation. A repeated use of the mechanical operation may cause a reduction in reliability and accuracy of the display device.

Accordingly, there is a need for a technique that detects an image itself on the display panel. Particularly, even when polarizing plates are formed on both surfaces of the display panel as in a display device, it requires a device for detecting an image. Accordingly, an infrared light source has been applied thereto.

However, when both an infrared light source and a visible light source are used, it requires a structure capable of controlling each of the infrared light source and the visible light source in order to efficiently use the light sources.

BRIEF SUMMARY OF THE INVENTION

An exemplary embodiment of the present invention provides a light source assembly capable of providing uniform infrared light while minimizing the number of infrared light sources.

An exemplary embodiment of the present invention also provides a touch screen device having the light source assembly.

In an exemplary embodiment of the present invention, there is provided a light source assembly including first light sources emitting first light in a first wavelength range, second light sources emitting second light in a second wavelength range which is at least partially different from the first wavelength range, and an optical member on which light emitted from the first light sources and the second light sources is incident. An average pitch of the second light sources arranged in a specific direction is larger than an average pitch of the first light sources arranged in the specific direction. The optical member has a reflectance with respect to the second light, which is larger than a reflectance with respect to the first light.

In another exemplary embodiment of the present invention, there is provided a touch screen device including a light source assembly, and a touch screen panel which receives light from the light source assembly. The light source assembly includes first light sources emitting first light in a first wavelength range, second light sources emitting second light in a second wavelength range which is at least partially different from the first wavelength range, and an optical member on which light emitted from the first light sources and the second light sources is incident. An average pitch of the second light sources arranged in a specific direction is larger than an average pitch of the first light sources arranged in the specific direction. The optical member has a reflectance with respect to the second light, which is larger than a reflectance with respect to the first light.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. In the drawings, the size and relative sizes of layers and regions may be exaggerated for clarity.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. Throughout the specification, like reference numerals in the drawings denote like elements.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be described in detail with reference to the accompanying drawings.

Figure 1:
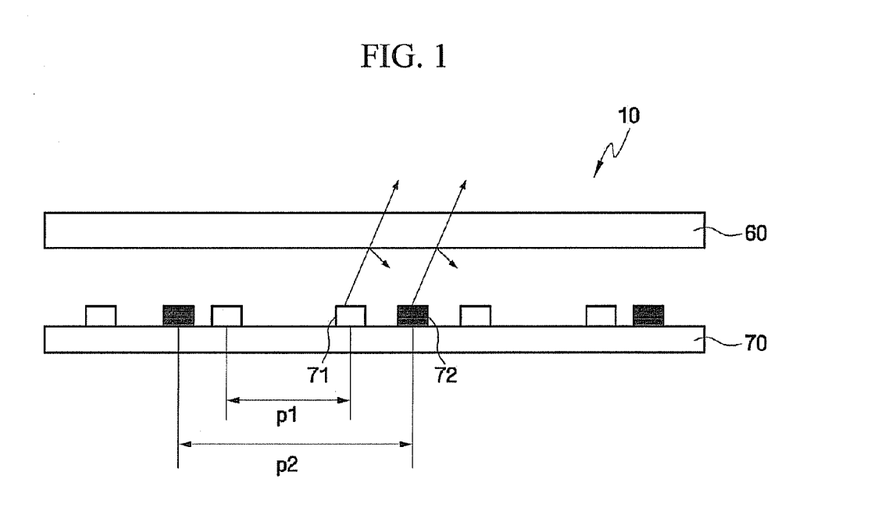
FIG. 1 schematically shows an exemplary embodiment of a light source assembly, in accordance with the present invention.

FIG. 1 schematically shows an exemplary embodiment of a light source assembly, in accordance with the present invention.

Referring to FIG. 1, a light source assembly 10 includes a plurality of first light sources 71, a plurality of second light sources 72 and an optical member 60.

The first light sources 71 emit first light in a first wavelength range. The second light sources 72 emit second light in a second wavelength range, which is at least partially different from the first wavelength range.

In this case, emitting light in a specific wavelength range may be interpreted as generally emitting light having a wavelength at a main peak in the optical spectrum. That is, it should be understood that emission of light in a wavelength range of visible light does not mean that there is no emission of light outside the wavelength range of visible light, such as a small amount of ultraviolet light or infrared light.

In some embodiments, the second wavelength range may be larger than the first wavelength range. In one exemplary embodiment, for example, the first wavelength range may be partially in or totally within the wavelength range of visible light, and the second wavelength range may be partially in or totally within the wavelength range of infrared light.

The first light sources 71 emit the first light in the first wavelength range, but it should not be interpreted as all of the first light sources 71 emit light in the same wavelength range. In one exemplary embodiment, for example, if the first wavelength range is from about 400 nanometers (nm) to about 700 nm, although all of the first light sources 71 may emit light in a the wavelength range from about 400 nm to about 700 nm, some first light sources 71 may emit light in a wavelength range of about 400 nm to about 600 nm, whereas some other first light sources 71 may emit light in a wavelength range of about 500 nm to about 700 nm.

Further, the wavelength ranges of all the first light sources 71 may not necessarily cover the entire wavelength range from 400 nm to 700 nm. In one exemplary embodiment, for example, a first group of first light sources 71 may emit light in a wavelength range of about 400 nm to about 450 nm, a second group of first light sources 71 different from the first group may emit light in a wavelength range of about 520 nm to 570 nm, and a third group of first light sources 71 different from the first and second groups may emit light in a wavelength range of about 650 nm to about 700 nm. That is, even though light in specific wavelength bands (e.g., 450 nm to 520 nm and 570 nm to 650 nm) in the defined wavelength range from 400 nm to 700 nm is not emitted, if the wavelengths of light emitted from the first light sources 71 are in a range from about 400 nm to about 700 nm, it can be interpreted as that the first wavelength range of the first light sources 71 range from 400 nm to 700 nm. The same interpretation as in the first light sources 71 may be applied to the second light sources 72.

Figure 2:
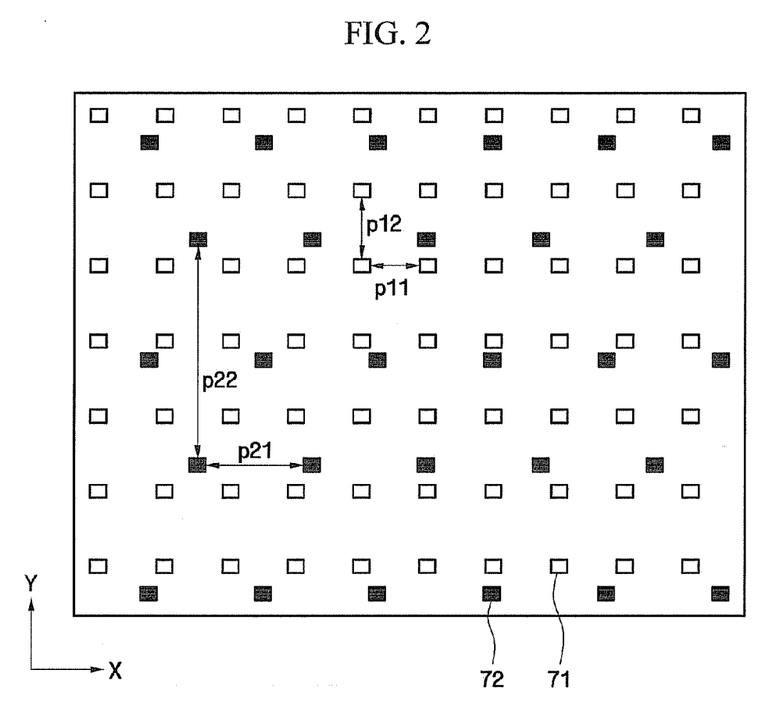
FIGS. 2 to 4 are plan views showing exemplary embodiments of the shape and arrangement of first light sources and second light sources, in accordance with the present invention.
Figure 3:
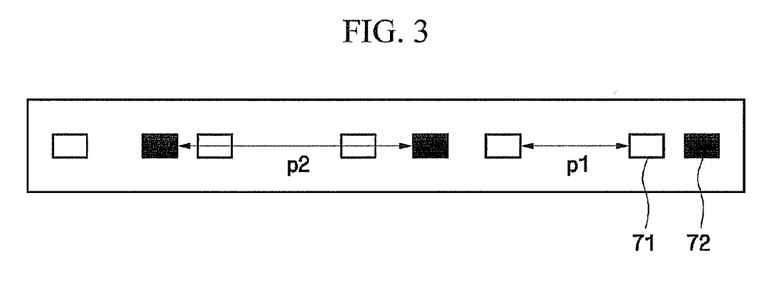
Figure 4:
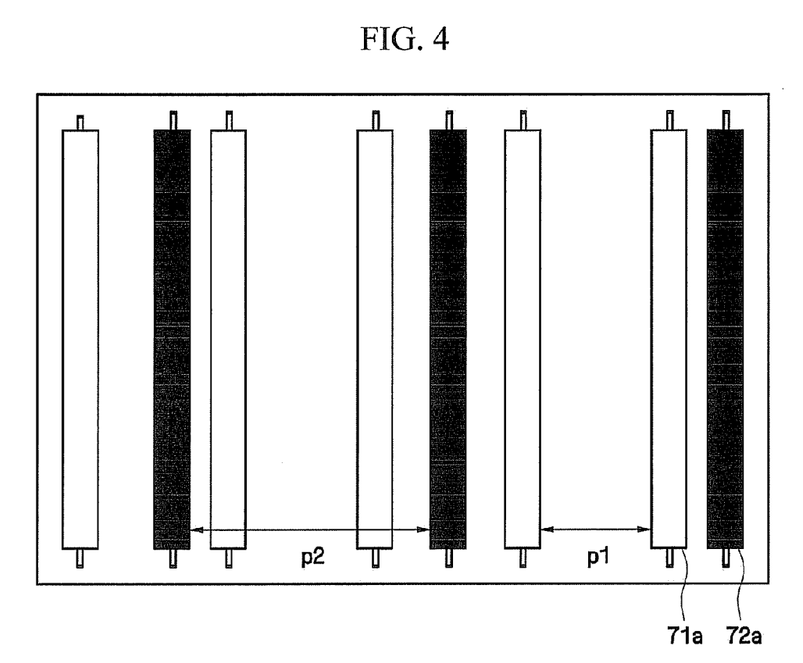

FIGS. 2 to 4 are plan views showing exemplary embodiments of the shape and arrangement of the first light sources and the second light sources, in accordance with the present invention.

As shown in FIGS. 2 and 3, the first light sources 71 and the second light sources 72 may be point light sources. In one exemplary embodiment, for example, light emitting diode ("LED") light sources may be used as the point light sources. In some embodiments, the first light sources 71 may be visible LED light sources emitting first light in a wavelength range of visible light, and the second light sources 72 may be infrared LED light sources emitting second light in a wavelength range of infrared light.

FIG. 2 shows an exemplary embodiment in which the first light sources 71 and the second light sources 72 serving as point light sources, are arranged two-dimensionally in the plan view. The first and second point light sources 71 and 72 arranged two-dimensionally may be applied to a direct-type light source assembly, without being limited thereto.

In FIG. 2, the first light sources 71 and the second light sources 72 are distributed and arranged in a first direction X, and in a second direction Y perpendicular to the first direction X. An average pitch p11 of the first light sources 71 in the first direction X is smaller than an average pitch p21 of the second light sources 72 in the first direction X. In this case, the average pitch may mean an average distance between the centers of two adjacent first light sources 71, e.g., in the first direction X. Supposing that the first light sources 71 and the second light sources 72 are, respectively, uniformly distributed and arranged in substantially the same region in the first direction X, that the average pitch p21 of the second light sources 72 in the first direction X is larger than the average pitch p11 of the first light sources 71 in the first direction X means that a number of the first light sources 71 is larger than a number of the second light sources 72 in the first direction X.

In the same manner, an average pitch p12 of the first light sources 71 in the second direction Y is smaller than an average pitch p22 of the second light sources 72 in the second direction Y.

In one exemplary embodiment, for example, the average pitches p21 and p22 of the second light sources 72 in the first direction X or the second direction Y, may be 1.2 times to 3 times the average pitches p11 and p12 of the first light sources 71 in the first direction X or the second direction Y, respectively. However, it is not limited thereto, and a ratio of the average pitches may be not within the above-mentioned range. The average pitches p11 and p12 of the first light sources 71 in any of the first direction X and the second direction Y may be equal to or smaller than the average pitches p21 and p22 of the second light sources 72 in any of the first direction X and the second direction Y, respectively.

In the exemplary embodiment of FIG. 2, the first light sources 71 are arranged in a grid pattern, and the average pitch p11 in the first direction X is substantially the same as the average pitch p12 in the second direction Y. Further, the second light sources 72 are arranged alternately in rows, where a row is defined as an aligned group of light sources in the first direction X and/or the second direction Y. In other words, the second light sources 72 arranged in a first row directly next to a second parallel row, are arranged between the second light sources 72 in the second row, and the average pitch p21 in the first direction X is smaller than the average pitch p22 in the second direction Y.

If the first and second light sources 71 and 72 of FIG. 2 are applied to a liquid crystal display device of 0 inches (1,016 millimeters (mm)), the average pitch p11 of the first light sources 71 in the first direction X may be about 27.25 mm, and the average pitch p12 of the first light sources 71 in the second direction Y may be about 27.15 mm. Further, the average pitch p21 of the second light sources 72 in the first direction X may be about 40.88 mm, and the average pitch p22 of the second light sources 72 in the second direction Y may be about 54.2 mm. The arrangement pattern and pitches may be variously modified if necessary.

FIG. 3 shows an exemplary embodiment in which the first light sources 71 and the second light sources 72 are arranged linearly in any one of the first direction and the second direction of FIG. 2. Accordingly, it can be seen that an average pitch p1 of the first light sources 71 is smaller than an average pitch p2 of the second light sources 72, taken in a same longitudinal direction of the linear arrangement or row. The first and second point light sources 71 and 72 arranged linearly as in FIG. 3 may be applied to an edge-type light source assembly.

FIG. 4 shows an exemplary embodiment in which first light sources 71a and second light sources 72a are linear light sources. Average pitches p1 and p2 of the first light sources 71a and second light sources 72a are similar to the average pitches of the light sources in a specific direction of FIG. 3. That is, the average pitch p1 of the first light sources 71a is smaller than the average pitch p2 of the second light sources 72a taken in the same direction.

As described above, in the embodiments of the present invention, the average pitch of the first light sources is smaller than the average pitch of the second light sources. The pitch of the light sources is generally proportional to a total distance occupied by the light sources, thereby determining luminous portions and dark portions. Regions including light sources are recognized as luminous portions, and regions including no light sources are recognized as relatively dark portions. Accordingly, the larger the pitch of the light sources, the more distinguishable the luminous and dark portions. Thus, it can be seen that the second light sources make a relatively larger distinction between the luminous and dark portions than the first light sources. As the dark portions have the lower luminance, occupy the wider area, and are more distinguishable from the luminous portions, it is disadvantageous to uniformity of light. A diffusion member such as a diffusion plate and diffusion sheet may be used to obtain a uniform surface light source. However, the cost of the diffusion member increases for more diffusion, and there is some loss in the luminance.

The average pitch of the light sources may be reduced to minimize the distinction between the luminous and dark portions. However, the smaller the pitch of the light sources, the larger the number of the light sources, thereby increasing the cost and power consumption of the display device. Accordingly, the pitch of the light sources is not allowed to decrease without limitation, and should be designed appropriately in due consideration of the cost, power consumption and the like.

Referring again to FIG. 1, the optical member 60 is disposed in a traveling path of light emitted from the first light sources 71 and the second light sources 72. The optical member 60 at least partially transmits and at least partially reflects the first light and the second light incident on the optical member 60, as shown by the arrows extending towards the optical member 60. That is, a portion of the light incident on the optical member 60 passes through the optical member 60, but a portion of the incident light is reflected. The light reflected from the optical member 60 returns to the first and second light sources 71 and 72. If a reflector is provided, the reflected light from the optical member 60 is reflected again to be incident on the optical member 60 again. The same operation may be repeated continuously.

The light, which is initially emitted from the first and second light sources 71 and 72 to be directly incident on the optical member 60 and then passes through the optical member 60, is generated directly from the first and second light sources 71 and 72. Accordingly, it is recognized as light generated near the first and second light sources 71 and 72 when seen from an outside of the optical member 60 (e.g., a viewing side or upper portion in FIG. 1). However, the light, which is incident on the optical member 60 again through at least two reflections after being initially emitted from the first and second light sources 71 and 72, and then passes through the optical member 60, is generally recognized as light generated away from the first and second light sources 71 and 72 when seen from the outside of the optical member 60. Accordingly, as the optical member 60 makes more reflections, there is high possibility of being recognized as light generated away from the first and second light sources 71 and 72. Consequently, the luminance of the regions including the first and second light sources 71 and 72 relatively decreases, and the luminance of the regions away from the first and second light sources 71 and 72 and including no light sources relatively increases, thereby reducing a luminance difference between the luminous and dark portions. This is advantageous to the uniformity of light.

As described above, the second light sources 72 have a larger distinction between luminous and dark portions because the average pitch of the second light sources 72 is greater than that of the first light sources 71 in at least one direction. Accordingly, it is preferable that the optical member 60 generates a larger reflection of the light emitted from the second light sources 72. To generate a larger reflection of light emitted from the second light sources, the optical member 60 may be designed such that a reflectance with respect to the second light emitted from the second light sources 72 is larger than a reflectance with respect to the first light emitted from the first light sources 71. This larger reflectance can be realized by employing a structure having different reflectances according to light wavelengths, because the first light and the second light have different wavelength ranges. A specific exemplary embodiment of the structure having different reflectances is illustrated in FIG. 5.

Figure 5:
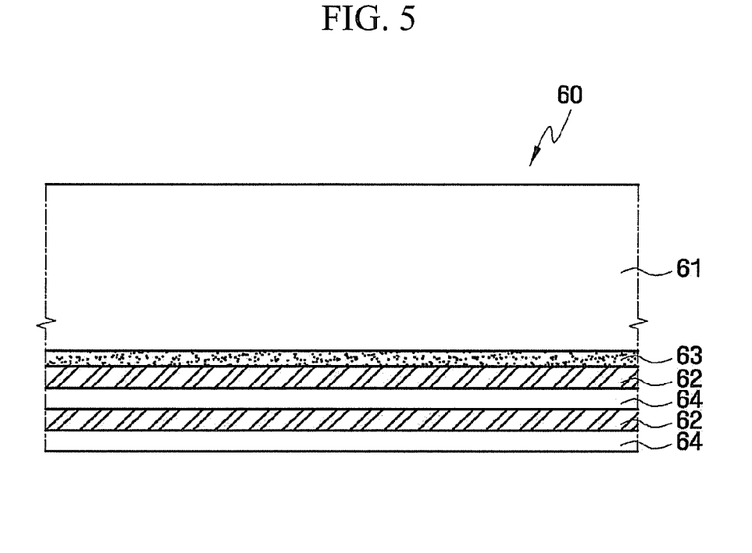
FIG. 5 is a cross sectional view of an exemplary embodiment of an optical member, in accordance with the present invention.

FIG. 5 is a cross sectional view of an exemplary embodiment of an optical member in accordance with the present invention. Referring to FIG. 5, the optical member 60 includes first refractive layers 62 and second refractive layers 64. The first refractive layers 62 have a first refractive index. The second refractive layers 64 have a second refractive index greater than the first refractive index.

The first refractive layers 62 and the second refractive layers 64 are alternately laminated. No limitation is imposed on the number of the laminated refractive layers, and various modifications can be made. However, it is preferable that the layer on which the light emitted from the first and second light sources 71 and 72 is first incident is the second refractive layer 64 having a relatively high refractive index in order to maximize reflection efficiency, which will be described later.

That is, the second refractive layers 64 and the first refractive layers 62 may be sequentially and alternately laminated, with the second refractive layer 64 as a starter when seen from the first and second light sources 71 and 72. In some embodiments, the number of the first refractive layers 62 may be substantially equal to the number of the second refractive layers 64. FIG. 5 illustrates a case where two first refractive layers 62 and two second refractive layers 64 are alternately laminated. It can be seen from FIG. 5 that the second refractive layer 64 having a high refractive index is closer to the first and second light sources 71 and 72, compared to the first refractive layer 62. Specifically, the starting second refractive layer 64 faces the first and second light sources 71 and 72.

The first refractive layers 62 may include any one material selected from the group consisting of polymethylmethacrylate ("PMMA"), metha styrene ("MS") and polystyrene ("PS"). The second refractive layers 64 may include any one material selected from the group consisting of polyethylene naphtalate ("PEN"), copolymer-polyethylene naphtalate ("CO-PEN"), cyclic olefin polymer ("COP"), polyethylene terephtalate ("PET") and polycarbonates ("PC").

The refractive indexes of the first refractive layers 62 and the second refractive layers 64 are determined by the selected materials, but they may also be changed according to a processing method used to fabricate the refractive layer. In one exemplary embodiment, for example, if stretching and extrusion processes are performed after initially forming the refractive layer, the refractive index is varied.

The variation of the refractive index is different according to the selected material. In exemplary embodiments for example, materials such as PEN, PET, CO-PEN, COP and PC have a positive intrinsic birefringence before stretching, so that the refractive index thereof increases in the stretching direction as the initially formed refractive layer is stretched in a specific direction. However, materials such as PS and PMMA have a negative intrinsic birefringence before stretching, so that the refractive index thereof is reduced in the stretching direction after the initially formed refractive layer is stretched in a specific direction. The detailed description will be given with reference to FIG. 6.

Figure 6:
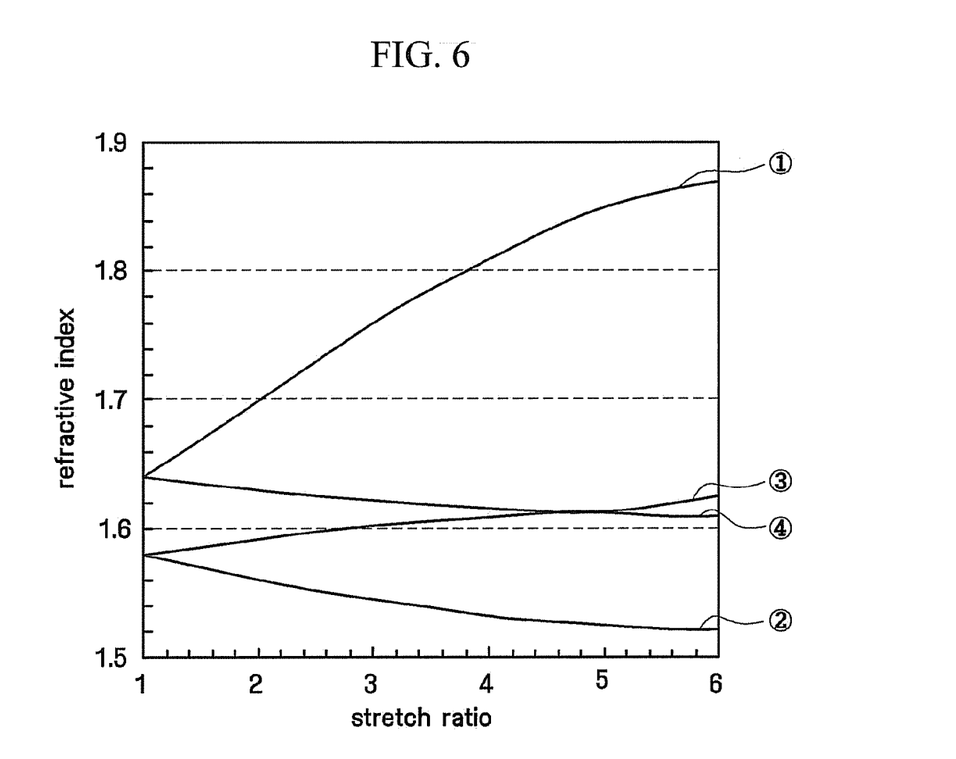
FIG. 6 is a graph showing variation of the refractive index versus stretch ratio.

FIG. 6 is a graph showing variation of the refractive index versus stretch ratio. In FIG. 6, ① represents variation of the refractive index versus stretch ratio when PEN is stretched in a transverse direction ("TD"), ② represents variation of the refractive index versus stretch ratio when syndiotatic polystyrene ("sPS"), one type of PS, is stretched in the TD, ③ represents variation of the refractive index versus stretch ratio when sPS is stretched in a mechanical direction ("MD"), and ④ represents variation of the refractive index versus stretch ratio when PEN is stretched in the MD. In this case, the MD is a direction in which a film is transferred in a stretching machine, and the TD is a direction perpendicular to the MD.

Referring to FIG. 6, it can be seen that the PEN has a refractive index which sharply increases when it is stretched in the TD, whereas the sPS has a refractive index which decreases when it is stretched in the TD. On the contrary, PEN has a refractive index which slightly decreases when it is stretched in the MD perpendicular to the TD, whereas the sPS has a refractive index which slightly increases when it is stretched in the MD.

Accordingly, it can be seen that it is preferable to take into account characteristics according to materials, stretching directions and stretch ratios in order to determine a first refractive index and a second refractive index.

Referring again to FIG. 5, the optical member 60 may further include a base member 61. The base member 61 may have a third refractive index. In this case, the third refractive index may be larger than the first refractive index, and smaller than the second refractive index.

The base member 61 may include, e.g., PET, PC or the like. In some embodiments, the base member 61 may be a common base for a diffusion sheet, a base for a diffusion plate, or a base for a light guiding plate. In this case, the optical member 60 may be formed integrally with the diffusion sheet, the diffusion plate or the light guiding plate, since the elements share a common feature, that is, the base member 61.

The first refractive layers 62 and the second refractive layers 64 are laminated on the base member 61. In one exemplary embodiment, for example, a structure in which the first refractive layers 62 and the second refractive layers 64 are alternately laminated is separately fabricated, and then adhered to the base member 61 by using an adhesive layer 63 or the like. Alternatively, the lamination may be performed by coextrusion of the base member 61 and the first and second refractive layers 62 and 64. In the embodiment of FIG. 5, the base member 61 of the optical member 60 is located at the farthest position from the first and second light sources 71 and 72.

A refractive index difference between the first refractive layers 62 and the second refractive layers 64 arranged alternately, and thicknesses of the first and second refractive layers 62 and 64, serve as factors determining interference for light from the first and second light sources 71 and 72. The reflectance varies according to the interference for light.

In the optical member 60 having the structure of FIG. 5, if the optical distance is the product of the thickness, and the refractive index of each refractive layer is odd multiples of the wavelength of the incident light, the reflectance with respect to light normally incident on the optical member may be calculated as follows:

$$R_{max} = \left[\frac{n_m/n_s - (n_A/n_B)^{2N}}{n_m/n_s + (n_A/n_B)^{2N}}\right]^2$$

where $R_{max}$ is a maximum reflectance with respect to the normally incident light, $n_s$ is a refractive index of the base member 61, $n_m$ is a refractive index of air, $n_A$ is a refractive index of the first refractive layers, $n_B$ is a refractive index of the second refractive layers, and N is a total number of the laminated first and second refractive layers.

In one exemplary embodiment, for example, when a wavelength λ of light emitted from the light source is 850 nm, the optical distance of each refractive layer is set to be about 9 times λ/4, taking into consideration the thickness feasible in extrusion. It can be supposed that the first refractive layer 62 has a refractive index of 1.52 and is formed of sPS, and the second refractive layer 64 has a refractive index of 1.85 and is formed of PEN.

The following equation can be established under the above conditions.

$$9 \times 850 \text{ nm}/4 = n_A \times d_A = n_B \times d_B = 1917 \text{ nm}.$$

From the above equation, it is possible to design the first and second refractive layers 62 and 64 such that the thickness $d_A$ of the first refractive layer is 1.29 micrometers (μm) and a thickness $d_B$ of the second refractive layer is 1.15 μm. The thicknesses $d_A$ and $d_A$ are taken in a direction perpendicular to the base member 61.

The reflectance can be determined based on the above results. In one exemplary embodiment, for example, if the base member 61 is formed of PC having a refractive index of 1.59, the refractive index of the optical member 60 depending on the number of the laminated first and second refractive layers can be calculated by using an equation regarding the reflectance with respect to the normally incident light. The calculation results are shown in the table below. In the following table, a two-layer structure refers to a structure in which one second refractive layer 64 and one first refractive layer 62 are laminated.

|  | Two-layer structure | Four-layer structure | Six-layer structure | Eight-layer structure | Ten-layer structure |
|---|---|---|---|---|---|
| Reflectance | 16.3% | 30.7% | 45.6% | 59.1% | 70.2% |

The reflectance of the optical member 60 with respect to light of a specific wavelength can be adjusted by the above-described method, thereby improving the uniformity of light. Even though it is impossible to achieve perfect uniformity of light only by adjusting the reflectance of the optical member 60, if the uniformity of light can be improved by combination with a diffusion plate, diffusion sheet or the like, the improvement of light uniformity by adjusting the reflectance of the optical member 60 may be significant for total uniformity. The reflectance of the optical member 60 with respect to light of a specific wavelength, e.g., the reflectance with respect to the second light in the embodiment of FIG. 1, may range from about 30% to about 75%. However, the range of reflectance is merely exemplary, and it may be modified according to an application device, possibility of adjusting the reflectance and the like.

Figure 7:
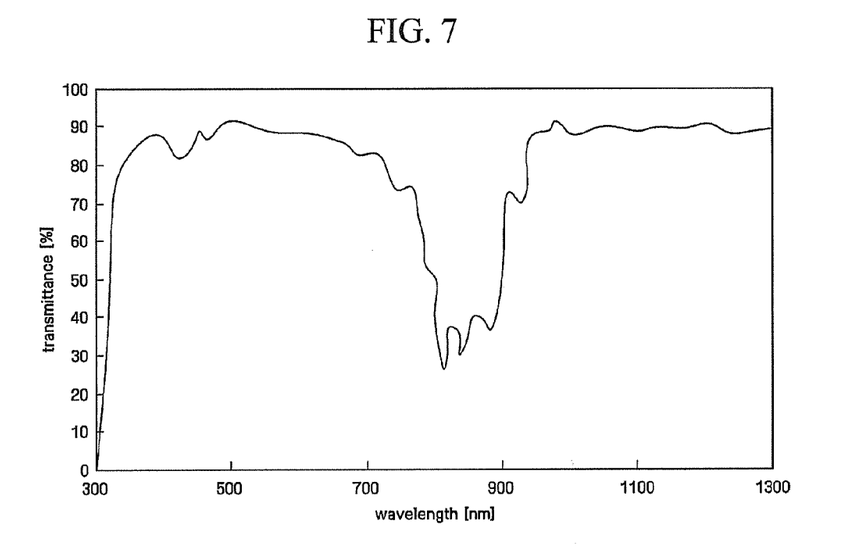
FIG. 7 is a graph showing transmittance of an exemplary embodiment of an optical member versus wavelength.

FIG. 7 is a graph showing an exemplary embodiment of transmittance of an optical member versus wavelength. FIG. 7 shows transmittance of light according to wavelength bands in the optical member 60 having a ten-layer structure as represented in the above table. Referring to FIG. 7, the optical member 60 having a structure, in which the first refractive layers 62 and the second refractive layers 64 are alternately and repeatedly laminated, has a transmittance which is lowered to about 30% at an infrared light region, e.g., around 800 nm to around 900 nm. In other words, it can be seen that the optical member 60 having a ten-layer structure can reflect about 70% light having a wavelength ranging from about 800 nm to about 900 nm.

Referring again to FIG. 1, the optical member 60 is arranged separated at a distance from the first light sources 71 and the second light sources 72. If the first light sources 71 and the second light sources 72 are arranged on substantially the same plane, for example, as in a case where they are arranged in a receiving vessel 70, a separation distance w (FIG. 12) between the optical member 60 and the first light sources 71 is substantially equal to a separation distance between the optical member 60 and the second light sources 72.

The separation distance w between the optical member 60 and the first light sources 71, and between the optical member 60 and the second light sources 72, influences the uniformity of the first light and the second light incident on the optical member 60. In one exemplary embodiment, for example, if the separation distance w between the optical member 60 and the first and second light sources 71 and 72 is too small, the area of light directly incident on the optical member 60 from the first and second light sources 71 and 72 is reduced. This means that the light is concentrated on a small area and, thus, light uniformity is relatively deteriorated. On the other hand, if the separation distance w between the optical member 60 and the first and second light sources 71 and 72 is too large, it is disadvantageous in the aspect of luminance, and it causes an increase in total thickness of the light source assembly 10.

As described above, the light uniformity is associated with not only the average pitch of the light sources, but also the separation distance between the optical member 60 and the first and second light sources 71 and 72. In one exemplary embodiment, for example, if the average pitch of the light sources is large, it may be disadvantageous in the aspect of light uniformity. Accordingly, it is preferable that the separation distance between the optical member 60 and the first and second light sources 71 and 72 is also large, to relate to, or be proportional to, the large average pitch. On the contrary, if the average pitch of the first and second light sources 71 and 72 is small, it is relatively advantageous to light uniformity. Accordingly, even though the separation distance between the optical member 60 and the first and second light sources 71 and 72 is small, it is possible to achieve specific light uniformity. That is, a ratio p/w of the average pitch p of the first and second light sources 71 and 72 to the separation distance w between the optical member 60 and the first and second light sources 71 and 72 is one factor determining light uniformity. In order to achieve sufficient uniformity, it is preferable that the ratio p/w is small, e.g., less than 1.

However, even though the ratio p/w is relatively high (e.g., equal to or higher than 1, and equal to or lower than 2.5), if the reflectance of the optical member 60 with respect to incident light is high, it is expected to improve uniformity, thereby compensating a decrease in uniformity due to an increase in the ratio p/w. In one exemplary embodiment, for example, although the separation distance w cannot be adjusted because the total thickness of the light source assembly 10 is fixed, if the reflectance of the optical member 60 is increased, it is possible to achieve the same uniformity even though the first and second light sources 71 and 72 have a larger average pitch p. It is advantageous that the optical member 60 is designed to have a larger reflectance as the average pitch p of the first and second light sources 71 and 72 is larger.

If the optical member 60 has a sufficient reflectance with respect to the second light, the average pitch p2 of the second light sources 72 can be relatively increased. If uniformity is more important than luminance in the second light, a reduction in luminance due to an increase in the average pitch p2 will not be very problematic. In one exemplary embodiment, for example, if the second light sources 72 are infrared light sources and infrared light emitted from the second light sources 72 is used only to detect an object, it is advantageous in the aspects of the cost and device stability to reduce the number of the second light sources 72 by increasing the average pitch p2 of the second light sources 72 as long as the uniformity is ensured. That is, the fact that the optical member 60 has a sufficient reflectance with respect to the second light may be associated with not only the improvement of uniformity of the second light, but also the improvement of the cost and device stability.

Figure 8:
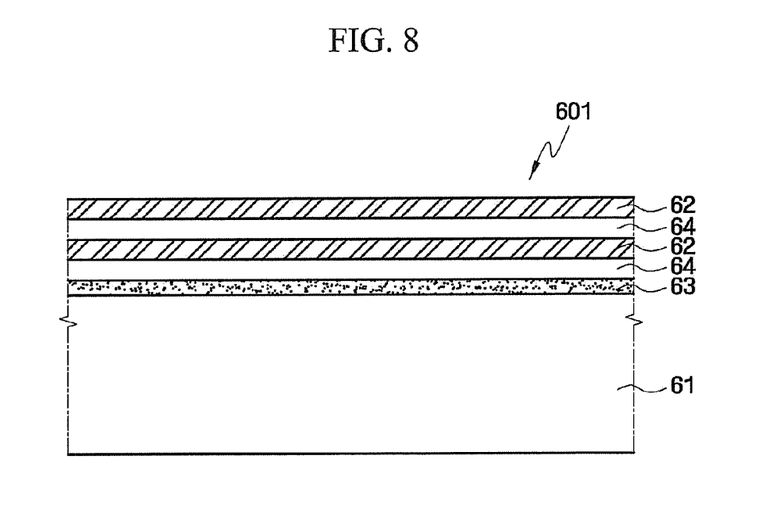
FIGS. 8 and 9 are cross sectional views showing alternative exemplary embodiments of optical members, in accordance with the present invention.

FIGS. 8 and 9 are cross sectional views showing alternative exemplary embodiments of optical members in accordance with the present invention. FIG. 8 shows an optical member 601, where relative arrangement of the base member 61, and a laminated body including the first refractive layers 62 and the second refractive layers 64 is opposite to that of the embodiment of FIG. 5. That is, the base member 61 is located at the nearest position to the first and second light sources 71 and 72, and the second refractive layers 64 and the first refractive layers 62 are sequentially and alternately laminated on only one side of the base member 61.

Figure 9:
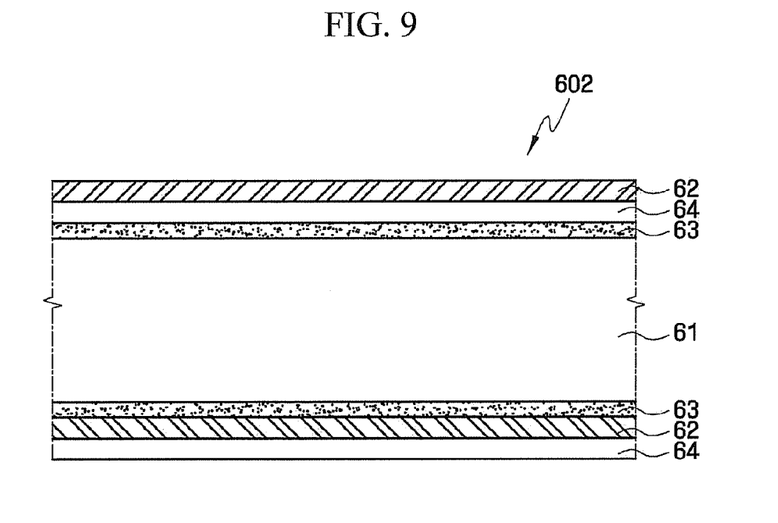

FIG. 9 illustrates an optical member 602 including laminated bodies of the first refractive layers 62 and the second refractive layers 64 are respectively on each of both upper and lower surfaces of the base member 61.

Although the above-mentioned reflectance may be slightly changed according to the relative location relationship between the base member 61 and the first and second refractive layers 62 and 64, the embodiments of FIGS. 8 and 9 have the same lamination order of the first refractive layers 62 and the second refractive layers 64 in the optical path. Accordingly, it can be understood that the substantial operations of the embodiments of FIGS. 8 and 9 are similar.

Figure 10:
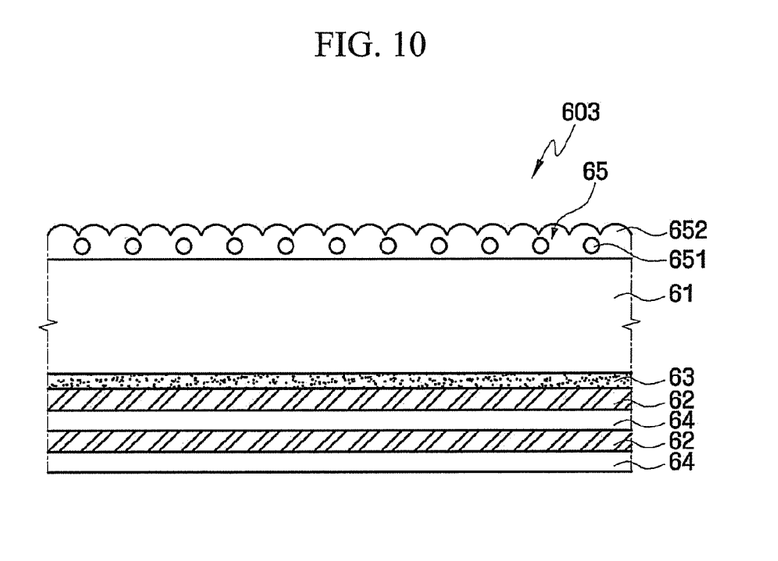
FIGS. 10 and 11 are cross sectional views showing additional alternative exemplary embodiments of optical members, in accordance with the present invention.
Figure 11:
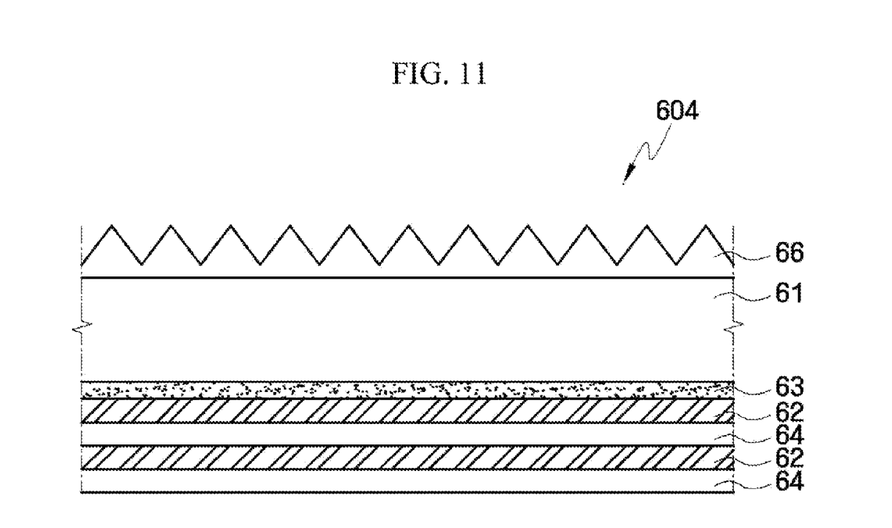

FIGS. 10 and 11 are cross sectional views showing additional alternative exemplary embodiments of optical members, in accordance with the present invention.

Referring to FIG. 10, an optical member 603 in accordance with the exemplary embodiment of the present invention is different from the embodiment of FIG. 5 in that the optical member 603 further includes a diffusion layer 65 as an optical function layer directly on the rear surface of the base member 61 (the surface opposite to the surface on which the first and second refractive layers 62 and 64 are laminated). The diffusion layer 65 may include a plurality of diffusion particles 651 therein, and/or may include a diffusion surface 652 as a rearmost surface of the optical member 603. The diffusion layer 65 may be formed integrally with the base member 61, such that the diffusion layer 65 and the base member 61 are a single unitary indivisible unit, for example, where the diffusion layer 65 is formed directly on the base member 61 during a manufacturing process. Alternatively, the diffusion layer 65 may be an element which is separately formed from the base member 61, and the subsequently disposed on the base member 61. The optical member 603 of the FIG. 10 may partially reflect light of a specific wavelength, and also serve as a diffusion sheet or diffusion plate.

Referring to FIG. 11, an optical member 604 in accordance with the exemplary embodiment of the present invention is different from the embodiment of FIG. 5 in that the optical member 604 further includes a prism pattern layer 66 as an optical function layer directly on the rear surface of the base member 61. The prism pattern layer 66 may be formed integrally with the base member 61, such that the prism pattern layer 66 and the base member 61 are a single unitary indivisible unit, for example, where the prism pattern layer 66 is formed directly on the base member 61 during a manufacturing process. Alternatively, the prism pattern layer 66 may be an element which is separately formed from the base member 61, and then subsequently disposed on the base member 61. The optical member 604 of the FIG. 11 may partially reflect light of a specific wavelength, and also serve as a prism sheet.

The light source assembly 10 in accordance with the exemplary embodiments of the present invention as described above, may be used as a lighting apparatus providing uniform light. Further, the light source assembly 10 in accordance with the exemplary embodiments of the present invention may be used as a back light unit or front light unit in a display device incapable of emitting light by itself, e.g., a liquid crystal display device. Moreover, since the light source assembly 10 in accordance with the exemplary embodiments of the present invention includes light sources of different wavelengths, it may be also applied to a touch screen device requiring not only visible light for displaying images but also infrared light for detecting an external object. Hereinafter, some exemplary embodiments of devices including the light source assembly will be explained.

Figure 12:
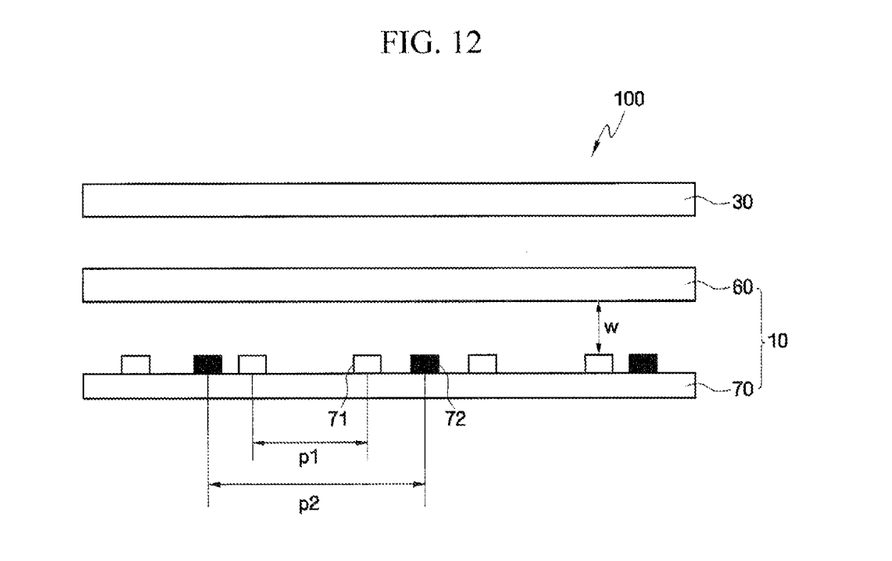
FIG. 12 shows a schematic configuration of an exemplary embodiment of a touch screen device, in accordance with the present invention.

FIG. 12 shows a schematic configuration of an exemplary embodiment of a touch screen device in accordance with the present invention. Referring to FIG. 12, a touch screen device 100 in accordance with the exemplary embodiment of the present invention includes the light source assembly 10, and a touch screen panel 30 disposed thereon. The light source assembly 10 in accordance with exemplary embodiments of the present invention includes the first light sources 71 employing visible LEDs emitting the first light in a wavelength range of visible light, and the second light sources 72 employing infrared LEDs emitting the second light in a wavelength range of infrared light.

Figure 13:
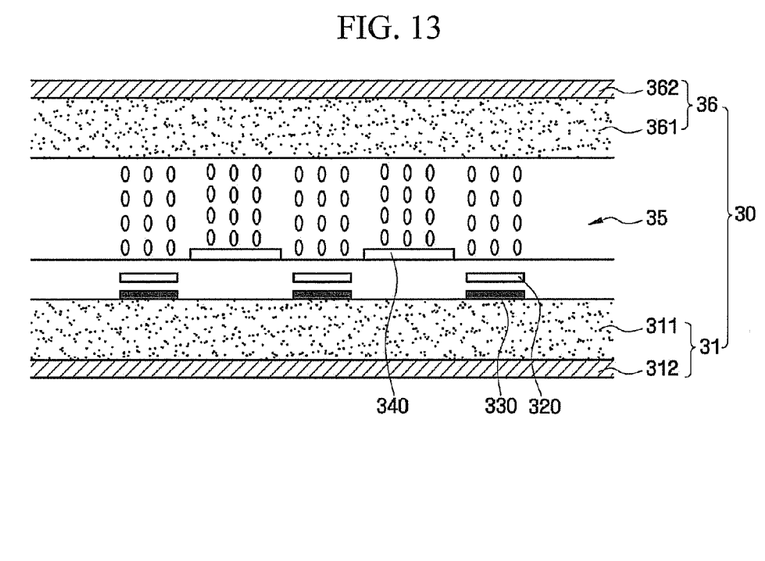
FIG. 13 is a cross sectional view showing an exemplary embodiment of the touch screen panel in the touch screen device of FIG. 12.

FIG. 13 is a cross sectional view showing an exemplary embodiment of the touch screen panel of FIG. 12. Referring to FIG. 13, the touch screen panel 30 includes a first display plate 31, a second display plate 36, and a liquid crystal layer 35 interposed between the first display plate 31 and the second display plate 36.

The first display plate 31 may include a plurality of pixels defined by gate lines (not shown) and data lines (not shown) on a first insulating substrate 311. The respective pixels may include pixel electrodes 340 electrically insulated from each other. Each of the pixel electrodes 340 is connected to a switching element (not shown) such that different data voltages can be applied to the pixel electrodes 340.

Light receiving elements 320 of the first display plate 31 are on the first insulating substrate 311. The light receiving elements 320 may be aligned with the respective pixels, and the number and/or density of the light receiving elements 320 may be variously adjusted if necessary.

The light receiving elements 320 are elements which receive light of a specific wavelength to output a specific signal, e.g., photoelectric conversion elements. In one exemplary embodiment, for example, the light of a specific wavelength may be light having a wavelength of infrared light (e.g., the second light in the embodiment of the present invention), but it is not limited thereto. The photoelectric conversion elements may be, for example, thin film transistors, photo diodes, and photoresistors. In some exemplary embodiments, the light receiving elements 320 may include a semiconductor layer such as P-N diodes, PIN diodes and the like. The semiconductor layer included in the light receiving elements 320 may include a material such as amorphous silicon ("a-Si"), polycrystalline silicon ("p-Si") and crystalline silicon ("c-Si"). Specifically, the semiconductor layer may include, e.g., hydrogenated amorphous silicon-germanium (a-SiGe:H).

Signal lines (not shown) are connected to the light receiving elements 320 of the first display plate 31 to transmit signals generated from the light receiving elements 320 to a sensing unit (not shown). The sensing unit senses the signals transmitted from the light receiving elements 320 to determine the position, shape and the like of an external object with respect to the touch screen panel 30.

Light blocking patterns 330 for blocking light may be provided below the light receiving elements 320 within the first display plate 31. The light blocking patterns 330 serve to block light transmitted from below the touch screen panel 30, that is, from the first and second light sources 71 and 72. The light receiving elements 320 may detect both light incident from above the touch screen panel 30, and light incident from below the touch screen panel 30. Light required to detect an object is the light incident from above the touch screen panel 30, and the light incident from below the touch screen panel 30 may be noise. Accordingly, the light blocking patterns 330 are provided between the light receiving elements 320 and the first and second light sources 71 and 72, to block light incident from below, thereby preventing noise.

As illustrated in FIG. 13, to block light incident from below, each of the light blocking patterns 330 may have a size entirely overlapping with the respective light receiving elements 320, in a plan view of the touch screen device 100. The light blocking patterns 330 may be designed to have a planar size larger than that of the light receiving elements 320, in order to block light obliquely incident from below. The light blocking patterns 330 may include any material capable of blocking light of a specific wavelength. However, for example, when the light blocking patterns 330 are formed with the same material as the gate lines and at the same time with the gate lines, it is possible improve processing efficiency because an additional mask process is unnecessary.

Although not shown in the drawings, an optical filter may be above the light receiving elements 320 in the first display plate 31. The optical filter serves to selectively transmit only light in a specific wavelength range. By employing the optical filter which transmits only infrared light reflected from an object in light incident from above the touch screen panel 30 and blocks other light, reliability of detecting an object can be improved.

The second display plate 36 includes a second insulating substrate 361. Although not shown in the drawings, e.g., a common electrode, color filters, and/or a black matrix may be provided on the second insulating substrate 361 of the second display plate 36.

The first display plate 31 and the second display plate 36 may further include, respectively, a first polarizing plate 312 and a second polarizing plate 362 attached externally thereto, to define an outermost layer of the touch screen panel 30.

The touch screen device 100 in accordance with alternative exemplary embodiments of the present invention may further include a touch substrate (not shown) on the touch screen panel 30. The touch substrate may be a glass or plastic substrate or the like.

Referring to FIGS. 12 and 13, the first light incident on the touch screen panel 30 from the first light sources 71 of the light source assembly 10 passes through the first polarizing plate 312, the liquid crystal layer 35 and the second polarizing plate 362 to display a specific image. The second light incident on the touch screen panel 30 from the second light sources 72 of the light source assembly 10 directly passes through the touch screen panel 30 and, if there is an external object on the touch substrate, it is reflected from the external object to be incident on the light receiving elements 320. The light receiving elements 320 include photoelectric conversion elements as described above, to generate a specific signal in response to the incident reflection light. This signal is transmitted to the sensing unit to determine the position, shape and the like of the object.

In contrast, if the second light is only used to detect the position and/or the shape of the object, the reflection light of the second light incident on the light receiving elements 320 only represents presence or absence of the external object, and its luminance is measured only to determine whether it is smaller or larger than a predetermined threshold. That is, the luminance of light incident on the light receiving elements 320 is only analyzed as a digital signal, and it is unnecessary to precisely control the luminance as an analog signal. Accordingly, in order to accurately detect the object, it is more important to control uniformity of the luminance of pixels rather than the luminous intensity of the incident light. In this aspect, in the light source assembly 10 in accordance with the exemplary embodiments of the present invention, even though the average pitch p2 of the second light sources 72 is increased, it is possible to increase uniformity of the second light. Accordingly, although the average luminance is somewhat decreased due to an increase in the average pitch p2 of the second light sources 72, reliability of detecting an object may be increased due to improvement of uniformity.

Figure 14:
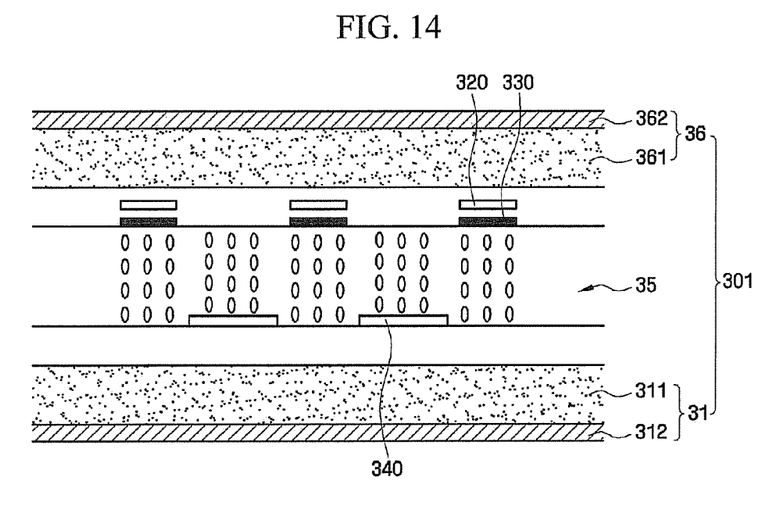
FIG. 14 is a cross sectional view showing an alternative exemplary embodiment of a touch screen panel, in accordance with the present invention.

FIG. 14 is a cross sectional view showing an alternative exemplary embodiment of a touch screen panel in accordance with the present invention. A touch screen panel 301 of the illustrated embodiment is different from the touch screen panel of FIG. 13 in that the light receiving elements 320 are provided at the second display plate 36. The light receiving elements 320 of the second display plate 36 are on the second insulating substrate 361. Since the light receiving elements 320 are in the second display plate 36, signal lines for transmitting signals generated from the light receiving elements 320 to a sensing unit (not shown) are also provided at the second display plate 36. The light blocking patterns 330 are arranged below the light receiving elements 320, that is, between the light receiving elements 320 and the first and second light sources 71 and 72. Although both the light blocking patterns 330 and the light receiving elements 320 are on the second display plate 36 in the illustrated embodiment, the light blocking patterns 330 may be on the first display plate 31, while the light receiving elements 320 are in the second display plate 36.

In the touch screen panel 301 of FIG. 14, the light receiving elements 320 are positioned relatively closer to the external object, than in the touch screen panel of FIG. 13. Accordingly, the touch screen panel of FIG. 14 has an advantage in accuracy of detecting an external object.

Figure 15:
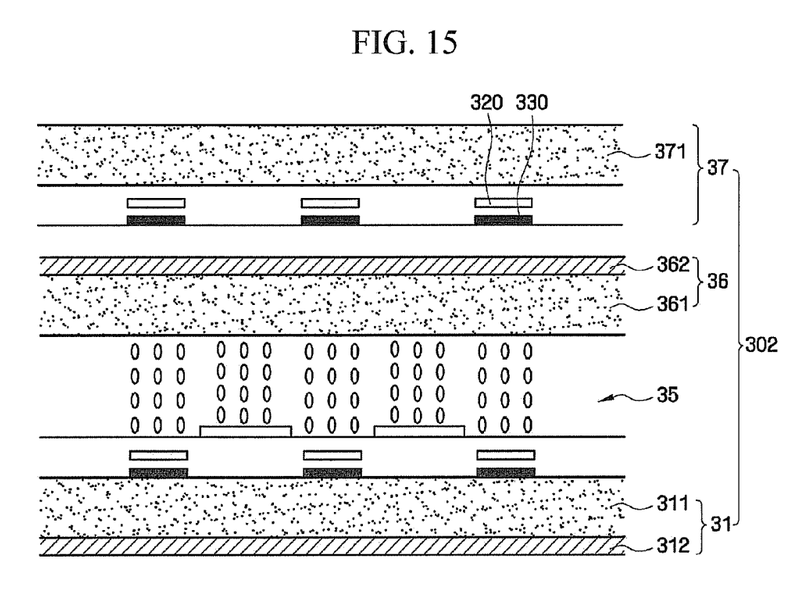
FIG. 15 is a cross sectional view showing another alternative exemplary embodiment of a touch screen panel, in accordance with the present invention.

FIG. 15 is a cross sectional view showing another alternative embodiment a touch screen panel in accordance with the present invention. A touch screen panel 302 of the illustrated embodiment is different from the touch screen panels of FIGS. 13 and 14 in that the light receiving elements 320 are provided within a touch substrate 37.

The touch substrate 37 includes a third insulating substrate 371. The light receiving elements 320 are on the third insulating substrate 371. Since the light receiving elements 320 are on the touch substrate 37, signal lines for transmitting signals generated from the light receiving elements 320 to a sensing unit (not shown) are also provided at the touch substrate 37. The light blocking patterns 330 are arranged below the light receiving elements 320, that is, between the light receiving elements 320 and the first and second light sources 71 and 72. Although both the light blocking patterns 330 and the light receiving elements 320 are on the touch substrate 37 in the illustrated embodiment, the light blocking patterns 330 may be on the second display plate 36 and/or the first display plate 31.

In the touch screen panel 302 of FIG. 15, the light receiving elements 320 are positioned relatively closer to the external object, than in the touch screen panels of FIGS. 13 and 14. Accordingly, the touch screen panel of FIG. 15 has a further advantage in accuracy of detecting an external object.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A light source assembly comprising:
    first light sources emitting first light in a first wavelength range, a distance between adjacent first light sources being a first average pitch;
    second light sources emitting second light in a second wavelength range which is at least partially different from the first wavelength range, a distance between adjacent second light source being a second average pitch; and
    an optical member on which lights emitted from the first light sources and the second light sources is incident,
    wherein
    the first light sources and the second light sources are arranged on substantially a same plane,
    the optical member is in a light emitting path of the first light sources and the second light sources,
    the second average pitch of the second light sources arranged in a specific direction, is larger than the first average pitch of the first light sources arranged in the specific direction,
    a ratio of the first average pitch of the first light sources, to a separation distance between the optical member and the first light sources, is smaller than 1, and
    a ratio of the second average pitch of the second light sources, to a separation distance between the optical member and the second light sources, is larger than 1, and
    a reflectance of the optical member with respect to the second light, is larger than a reflectance of the optical member with respect to the first light.

2. The light source assembly of claim 1, wherein the second average pitch of the second light sources is 1.2 times to 3 times the first average pitch of the first light sources.

3. The light source assembly of claim 1, wherein
    the first wavelength range includes a wavelength range of visible light, and
    the second wavelength range includes a wavelength range of infrared light.

4. The light source assembly of claim 3, wherein the reflectance of the optical member with respect to the second light emitted from the second light sources ranges from about 30% to about 75%.

5. The light source assembly of claim 1, wherein the first light sources and the second light sources are point light sources.

6. The light source assembly of claim 1, wherein
    the optical member comprises a first refractive layer and a second refractive layer alternating in a light emitting direction of the first and second light sources, and
    the first refractive layer has a first refractive index, and the second refractive layer has a second refractive index larger than the first refractive index.

7. The light source assembly of claim 6, wherein the first light emitted from the first light sources and the second light emitted from the second light sources, is incident on the second refractive layer before being incident on the first refractive layer.

8. The light source assembly of claim 6, wherein
    the first refractive layer includes one material selected from the group consisting of polymethylmethacrylate, metha styrene and poly styrene, and
    the second refractive layer includes one material selected from the group consisting of polyethylene naphtalate, copolymer-polyethylene naphtalate, cyclic olefin polymer, polyethylene terephtalate and polycarbonates.

9. The light source assembly of claim 6, wherein the optical member further comprises a base member which includes the first refractive layer and the second refractive layer on a first surface thereof,
    wherein the base member further includes an optical function layer on a second surface opposite to the first surface which the first refractive layer and the second refractive layer are on.

10. A touch screen device comprising:
    a light source assembly comprising:
        first light sources emitting first light in a first wavelength range, a distance between adjacent first light sources being a first average pitch;
        second light sources emitting second light in a second wavelength range which is at least partially different from the first wavelength range, a distance between adjacent second light sources being a second average pitch; and an optical member on which lights emitted from the first light sources and the second light sources is incident, wherein the first light sources and the second light sources are arranged on substantially a same plane, the optical member is in a light emitting path of the first light sources and the second light sources, a ratio of the first average pitch of the first light sources, to a separation distance between the optical member and the first light sources, is smaller than 1, a ratio of the second average pitch of the second light sources, to a separation distance between the optical member and the second light sources, is larger than 1, the second average pitch of the second light sources arranged in a specific direction, is larger than the first average pitch of the first light sources arranged in the specific direction, and a reflectance of the optical member with respect to the second light is larger than a reflectance of the optical member with respect to the first light; and a touch screen panel which receives light from the light source assembly.

11. The touch screen device of claim 10, wherein the second average pitch of the second light sources is 1.2 times to 3 times the first average pitch of the first light sources.

12. The touch screen device of claim 10, wherein the first wavelength range includes a wavelength range of visible light, and the second wavelength range includes a wavelength range of infrared light.

13. The touch screen device of claim 12, wherein the reflectance of the optical member with respect to the second light emitted from the second light sources ranges from about 30% to about 75%.

14. The touch screen device of claim 10, wherein the first light sources and the second light sources are point light sources.

15. The touch screen device of claim 10, wherein the optical member comprises a first refractive layer and a second refractive layer alternating, and the first refractive layer has a first refractive index, and the second refractive layer has a second refractive index larger than the first refractive index.

16. The touch screen device of claim 15, wherein the first refractive layer includes one material selected from the group consisting of polymethylmethacrylate, metha styrene and poly styrene, and the second refractive layer includes one material selected from the group consisting of polyethylene naphtalate, copolymer-polyethylene naphtalate, cyclic olefin polymer, polyethylene terephtalate and polycarbonates.

17. The touch screen device of claim 15, wherein the optical member further comprises a base member which includes the first refractive layer and the second refractive layer on a first surface thereof, wherein the base member further includes an optical function layer on a second surface opposite to the first surface which the first refractive layer and the second refractive layer are on.

18. The touch screen device of claim 10, wherein the touch screen panel includes a light receiving element.

19. The touch screen device of claim 18, wherein the touch screen panel further includes:

a first display plate, a second display plate facing the first display plate, and a touch substrate provided on the second display plate, and the light receiving element is within any one of the first display plate, the second display plate and the touch substrate.

* * * * *